United States Patent Office 3,396,074
Patented Aug. 6, 1968

3,396,074
LAMINATED SAFETY GLASS
Donald I. Christensen, East Longmeadow, Mass., assignor to Monsanto Company, St. Louis, Mo., a corporation of Delaware
No Drawing. Filed Aug. 3, 1965, Ser. No. 476,991
15 Claims. (Cl. 161—199)

This invention relates to improved laminated safety-glass. More particularly, this invention relates to laminated safety-glass having an interlayer of a plasticized polyvinyl acetal containing a fluoride compound which has higher resistance to penetration by an impacting object.

Laminated safety-glass comprises two or more glass panels bound with an interlayer of a transparent, adherent plastic. The usual plastic interlayer is a plasticized polyvinyl acetal resin formed in a sheet or film with a thickness of about 0.015 inch or more. The major commercial use of these safety-glass compositions is for automobile windshields, as well as for windshields in other moving vehicles. The ever increasing number of automobiles and the faster speed of travel today coupled with the greater area of modern day windshields have accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The interlayer therefore benefits the structure not only by adhering to the glass particles but also has the added advantage of absorbing energy on impact thereby decreasing the possibility of serious injury which may occur when a head strikes the windshield, while also supplying added resistance to penetration.

The interlayers in present day commercial windshields usually contain about 0.1 to 0.8% moisture. It has been reported that some increase in resistance to penetration is found if the moisture content of the plastic interlayer is considerably higher. However, the presence of increased moisture alone to improve the penetration resistance sufficiently is impractical because the clarity of the windshield is adversely affected by the formation of bubbles between the interlayer and the glass or within the interlayer. Further, the presence of excess moisture may cause delamination. Consequently, the automotive and laminating industries have not been able to take significant advantage of this method of improving resistance to penetration.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

Another object of this invention is to provide methods and means to accomplish the preceding objects.

These and other objects are accomplished in a laminated safety-glass by bonding two glass panels with an interlayer of a plasticized polyvinyl acetal resin; said interlayer having a moisture content of 0.1 to 0.8% by weight and containing from 0.01 to 3.0 parts by weight per hundred parts by weight of resin of at least one fluoride compound selected from the group consisting of fluorides of the alkali metals, calcium, antimony, beryllium, cadmium, germanium, silver, tin, zinc, silicates and borates.

Heretofore it has been customary to stabilize polyvinyl acetals for interlayers with potassium or sodium hydroxide and/or potassium or sodium acetate by adding small amounts of these materials during the preparation of the polyvinyl acetal. These alkaline materials may be left in the polyvinyl acetal resin or washed out according to the procedure described below without affecting the increased impact strength which is unexpectedly achieved with the fluoride compounds of this invention.

The following examples are given in illustration of the invention and are not intended as limitations thereof. All parts and percentages are by weight unless otherwise specified.

Example I is set forth as a control in order to illustrate the superior impact strength which is achieved when fluoride compounds are added to polyvinyl acetal interlayers in the practice of this invention.

EXAMPLE I

This example uses a conventional polyvinyl acetal interlayer for safety-glass. It is a polyvinyl butyral containing 18.8% vinyl alcohol by weight and having an Alkalinity Titer of 20 due to the presence of potassium acetate added during the manufacture of the resin. The resin is plasticized with 42 parts triethylene glycol di(2-ethyl butyrate) and has a moisture content of about 0.4%. The interlayer is formed into sheets 0.015 inch thick (15 gauge) and 0.030 inch thick (30 gauge). These interlayer sheets are used as controls.

Sets of ten glass laminates are individually prepared by interposing the 15 gauge interlayer between two 24 x 36 x 0.125 inch panels of glass and by interposing the 30 gauge interlayer between two 12 x 12 x 0.125 inch panels of glass. The resulting laminates are then subjected to a temperature of about 275° F. at a pressure of 185 p.s.i. for approximately 10 minutes to bond the laminate or panels together.

The laminates prepared by the above procedure are then subjected to Mean Break Height tests according to the recently established tentative specifications set up by the Society of Automotive Engineers, the Subcommittee on Automotive Glazing and the results tabulated in Table I.

In essence, the Mean Break Height test comprises placing the laminate in a horizontal position with a frame or edge support and while maintaining a laminate temperature of 70° F., allowing a 22-pound spherical ball (referred to as a head form) to drop from a designated height against approximately the middle of the laminate prepared with the 15 gauge interlayer. A 5-pound steel ball is used on the smaller laminate made with the 30 gauge interlayer. This test is repeated at increasing ball-drop heights to determine the approximate height in feet at which 50% of the laminates tested will resist penetration. In other words, the Mean Break Height of a laminate is a measure of the ability of that laminate to absorb the energy of an impacting object.

The following Examples II–XI are prepared and tested according to the procedure of Example I, using the same type of plasticized polyvinyl butyral.

Examples II and III are prepared using chloride compounds instead of fluoride compounds.

These are set forth along with Example I as controls in order to demonstrate that the surprising and unexpected increase in impact strength that results from using the fluoride compounds of this invention is peculiar to the fluorides and is not achieved with other halide compounds. The data on these control samples are listed in Table I.

TABLE I.—EXAMPLES I–III
Control samples

| Examples | Additive | Parts (PHR)* | Percent H₂O | Mean Break Height (feet) | |
|---|---|---|---|---|---|
| | | | | 15 gauge | 30 gauge |
| I | None | 0.02 | 0.40 | 2.3 | 7.0 |
| II | CaCl₂ | 0.03 | 0.33 | 2.2 | 7.1 |
| III | KCl | 0.04 | 0.45 | 2.4 | 7.4 |

*Parts by weight of halide compounds per hundred parts by weight of polyvinyl acetal resin.

Examples IV–XI, illustrate the concept of this invention of adding fluoride compounds to the interlayer in order to increase impact resistance. The data on these samples are tabulated in Table II.

TABLE II.—EXAMPLES IV–XI
Fluoride additives

| Examples | Additive | Parts (PHR)* | Percent H₂O | Mean Break Height (feet) | |
|---|---|---|---|---|---|
| | | | | 15 gauge | 30 gauge |
| IV | KF2H₂O | 0.03 | 0.37 | 2.7 | 16.9 |
| V | KF2H₂O | 0.04 | 0.40 | 5.1 | 18.4 |
| VI | KF2H₂O | 2.0 | 0.43 | 8.3 | 20.1 |
| VII | LiF | 0.03 | 0.43 | 3.5 | 15.2 |
| VIII | NaF | 0.04 | 0.36 | 3.2 | 12.8 |
| IX | Na₂SiF₆ | 0.09 | 0.32 | 2.7 | 9.3 |
| X | Na₂SiF₆ | 2.0 | 0.41 | 3.0 | 13.8 |
| XI | KBF₄ | 0.13 | 0.51 | 3.9 | 13.7 |

*Parts by weight of fluoride compounds per hundred parts by weight of polyvinyl acetal resin.

A comparison of Tables I and II shows that the control samples have a Mean Break Height of 8.5 feet with a 30 gauge interlayer, while on the other hand, the fluoride containing interlayers listed in Table II show a significant increase in Mean Break Heights at concentrations of from 0.03 to 2.0 parts of fluoride compound.

A comparison of Examples II–III with Examples IV–XI illustrates the unique role of the fluoride additive in that similar chloride compounds fail to show the increased impact resistance.

Especially preferred are interlayers containing of from 0.01 to 3.0 parts by weight of fluoride compound per hundred parts by weight of resin. Levels higher than 3.0 parts are undesirable because these higher levels may cause some haze, discoloration or edge separation in the laminate.

The laminated safety-glass of this invention is especially efficient in that the improved resistance to penetration is balanced over a wide temperature range. The impact tests shown in the examples are conducted at room temperature, however, tests conducted at as low as 40° F. and as high as 120° F. indicate that these laminates exhibit improved properties over a wide temperature range.

It is well known that an increase in the thickness of the plasticized polyvinyl butyral interlayer will give some improvement to the penetration resistance of the laminates. This invention is equally applicable to the thicker laminates. In fact the use of an 0.030 inch interlayer containing these fluoride additives results in Mean Break Heights more than double those of the 0.015 inch interlayers of the examples. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts against stationary objects even where the automobile was travelling at speeds in excess of 25 m.p.h. In other words, at normal interlayer moisture contents, if fluoride compounds are added to the interlayer in accordance with the practice of this invention, a far superior safety laminate will result.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is preferred that the moisture content be maintained rather low, i.e., 0.1 to 0.8%. On the other hand, the impact resistance of the polyvinyl butyral interlayer can be readily increased by the addition of these fluoride compounds during the preparation of the polyvinyl butyral resin.

Higher moisture levels are undesirable because of the tendency to cause bubbles or blisters in the laminate. Lower moisture levels are especially difficult to attain and maintain, and in fact, it appears as if some amount of moisture is desirable. It is preferable that the interlayers have a moisture content of 0.2 to 0.6%.

Table III illustrates the lack of effect of moisture within the normal moisture range in the absence of any salts, fluoride or otherwise, on the impact strength of various sets of glass laminates. The plasticized interlayer sheets are washed free of alkaline materials that were added during the manufacturing process according to the procedure described below.

TABLE III.—EFFECT OF MOISTURE ON MEAN BREAK HEIGHT

| Percent Moisture Content | Mean Break Height, feet | |
|---|---|---|
| | 15 gauge Interlayer | 30 gauge Interlayer |
| .06 | 2.3 | 7.5 |
| .31 | 2.4 | 7.7 |
| .37 | 2.4 | 7.8 |
| .50 | 2.8 | 8.0 |
| .75 | 3.0 | 8.3 |

In general, the laminates are prepared by interposing the plasticized polyvinyl butyral interlayer between a pair of glass plates and then subjecting the resulting assembly to a temperature of 190 to 325° F. and a pressure of 150 to 225 p.s.i. for at least 10 minutes to bond the assembly together.

The fluoride compounds which are employed in the present invention are fluoride compounds such as lithium fluoride, sodium fluoride, potassium fluoride, rubidium fluoride, cesium fluoride, antimony fluoride, beryllium fluoride, cadminum fluoride, germanium fluoride, silver fluoride, zinc fluoride, stannous fluoride, sodium fluosilicate, sodium fluoborate, etc.

The polyvinyl acetal resins which are employed in the present invention may be made from various unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, buyrate, 2-ethylhexylate, etc. in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Patent No. Re. 20,430 dated June 29, 1937, and Lavin et al. U.S. Patent No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general, the polyvinyl acetal resins employed have Staudinger molecular weights ranging from about 50,000 to 600,000 and preferably from 150,000 to 270,000 and may be considered to be made up, on a weight basis, of from 5 to 25% hydroxyl groups, calculated as polyvinyl alcohol, 0 to 40% ester, and preferably acetate, groups, calculated as polyvinyl ester, e.g., acetate, and the balance substantially acetal. When the acetal is butyraldehyde acetal, the polyvinyl acetal resin well preferably contain, on a weight basis, from 9 to 30% hydroxyl groups, calculated as polyvinyl alcohol and from 0 to 3% ester, e.g., acetate, groups, calculated as polyvinyl ester, the balance being substantially butyraldehyde acetal.

The resin prepared according to the above methods will contain some potassium acetate, sodium acetate or other alkaline materials depending on the process used. These materials may be washed out according to the following procedure. The resin is swelled in a mixture of alcohol-water (0.960 sp. gr.) at about 40° C. for about 1 hour and then washed thoroughly with water until the dried resin is neutral to brom-phenol blue. This is tested by dissolving 7 grams of resin in 250 cc. of pre-neutralized ethanol using brom-phenol blue as an indicator. Appropriate amounts of the fluoride compounds of this invention are then added to a slurry of the washed resin (5 parts water per part of resin). After 30 minutes, the grains are filtered and dried.

It is not necessary to wash the alkaline materials added during the manufacturing process from resin. The fluoride compounds may be added to unwashed resin as in the slurry method above or by dissolving the fluoride in a suitable solvent such as water or ethanol and adding the solution to a flux of molten resin which is blended to achieve uniform dispersion of the fluoride.

An alternate procedure that may be used, especially where no suitable solvent is available, is to dry blend the polyvinyl acetal resin and the fluoride compound. Further dispersion of the fluoride will be achieved during the plasticization step, in each of the above methods.

The resin produced may be plasticized to the extent of about 20 to 60 parts plasticizer per 100 parts resin and more commonly between 35 and 50 parts for normal windshield use. This latter concentration is generally used with polyvinyl butyrals containing 18 to 23% vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and di(beta-butoxyethyl) adipate. The resulting plasticized resin mixture is then generally extruded in the form of sheets and cut to size to produce the interlayers used in the present invention. The plasticized polyvinyl butyral resin interlayer is self-adhesive in nature thereby eliminating the need for a separate adhesive to bond the glass laminate together.

Safety-glass laminates find special application in the automotive and aircraft industries for protecting passengers both against the hazards of flying objects and to reduce injury caused by bodily impact against the laminate. Wherever else glass or transparent panels are utilized such as in the building trade, the protection afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed is:

1. An improved interlayer for laminated safety-glass comprising a plasticized polyvinyl acetal resin; said interlayer having a moisture content of 0.1 to 0.8% by weight and containing from 0.01 to 3.0 parts by weight per hundred parts by weight of resin of at least one fluoride compound selected from the group consisting of fluorides of the alkali metals, calcium, antimony, beryllium, cadmium, germanium, silver, tin, zinc, silicates and borates.

2. An improved interlayer as in claim 1 wherein the polyvinyl acetal is polyvinyl butyral.

3. An improved interlayer as in claim 2 wherein the polyvinyl butyral has a vinyl alcohol content of from 9 to 30% by weight and is plasticized with from 20 to 60 parts of plasticizer per 100 parts polyvinyl butyral.

4. An improved interlayer as in claim 1 wherein the fluoride compound is potassium fluoride.

5. An improved interlayer as in claim 2 wherein the fluoride compound is lithium fluoride.

6. An improved interlayer as in claim 2 wherein the fluoride compound is potassium fluoborate.

7. An improved interlayer as in claim 2 wherein the fluoride compound is zinc fluoride.

8. An improved laminated safety-glass comprising two layers of glass bonded to a plasticized polyvinyl acetal interlayer; said interlayer having a moisture content of 0.1 to 0.8% by weight and containing from 0.01 to 3.0 parts by weight per hundred parts by weight of resin of at least one fluoride compound selected from the group consisting of fluorides of the alkali metals, calcium, antimony, beryllium, cadmium, germanium, silver, tin, zinc, silicates and borates.

9. An improved laminated safety-glass as in claim 8 wherein the polyvinyl acetal is polyvinyl butyral.

10. An improved laminated safety-glass as in claim 9 wherein the polyvinyl butyral has a vinyl alcohol content of from 9 to 30% by weight and is plasticized with from 20 to 60 parts of plasticizer per 100 parts polyvinyl butyral.

11. An improved laminated safety-glass as in claim 9 wherein the fluoride is potassium fluoride.

12. An improved laminated safety-glass as in claim 9 wherein the fluoride is lithium fluoride.

13. An improved laminated safety-glass as in claim 9 wherein the fluoride is potassium fluoborate.

14. An improved laminated safety-glass as in claim 9 wherein the fluoride is zinc fluoride.

15. The method of preparing an improved plasticized polyvinyl acetal interlayer which comprises mixing an aqueous slurry of a polyvinyl acetal resin containing from 0.01 to 3.0 parts by weight per hundred parts by weight of resin of at least one fluoride compound selected from the group consisting of fluorides of the alkali metals, calcium, antimony, beryllium, cadmium, cesium, germanium, rubidium, silver, zinc, silicates and borates, filtering the resin and adjusting the moisture content of the resin to 0.1 to 0.8% by weight, plasticizing the resin and forming the interlayer.

References Cited
UNITED STATES PATENTS

| | | | |
|---|---|---|---|
| 3,051,054 | 8/1962 | Crandon | 156—106 |
| 3,231,461 | 1/1966 | Mattimoe | 161—199 |

ROBERT F. BURNETT, *Primary Examiner.*

W. J. VANBALEN, *Assistant Examiner.*